Nov. 16, 1965 J. T. MULLIN 3,218,396

TRANSDUCING SYSTEM

Filed Aug. 1, 1962 4 Sheets-Sheet 1

INVENTOR:
John T. Mullin

By Smyth, Roston & Pavitt
Attorneys

Nov. 16, 1965 J. T. MULLIN 3,218,396

TRANSDUCING SYSTEM

Filed Aug. 1, 1962 4 Sheets-Sheet 2

INVENTOR:
John T. Mullin
By Smyth, Roston & Pavitt
Attorneys

Nov. 16, 1965 J. T. MULLIN 3,218,396

TRANSDUCING SYSTEM

Filed Aug. 1, 1962 4 Sheets-Sheet 3

INVENTOR:
John T. Mullin

By Smyth, Roston & Pavitt
Attorneys

Nov. 16, 1965 J. T. MULLIN 3,218,396

TRANSDUCING SYSTEM

Filed Aug. 1, 1962 4 Sheets-Sheet 4

INVENTOR:
John T. Mullin

By Smyth, Roston & Pavitt
Attorneys

United States Patent Office 3,218,396
Patented Nov. 16, 1965

3,218,396

TRANSDUCING SYSTEM

John T. Mullin, Geneva, Switzerland, assignor to Minnesota Mining and Manufacturing Company, St. Paul, Minn., a corporation of Delaware
Filed Aug. 1, 1962, Ser. No. 214,052
17 Claims. (Cl. 179—100.1)

This invention relates to a transducing system. More specifically, the invention relates to the recording and reproduction on a recording medium such as a magnetic tape of a signal representative of information such as music so as to increase the dynamic range of the transducing system.

The upper limit of recording and reproducing sound such as music is determined by a maximum amount of distortion which may be tolerated as the magnetic medium approaches saturation. The lower limit of recording and reproduction is determined by the minimum signal-to-noise ratio which may be tolerated before the noise component becomes objectionable to a listener. In the magnetic tape recording and reproducing systems of the prior art, a maximum dynamic range of approximately 55 decibels can sometimes be obtained. This invention incorporates in the recording and reproducing system means to increase the dynamic range of a signal which may be recorded and reproduced from the previously obtainable range of 55 decibels to an increased range of at least 75 decibels.

The increase obtained by this invention in the dynamic range of the system is important since it allows the recording of information with an increased fidelity. For example in the recording of a signal which is representative of audio information, there are many instances when the highest level of the audio information is greater than 55 decibels above the lowest level of the audio information. The systems of the prior art have had to incorporate means to compress the dynamic range of the signal representative of the audio information so as not to exceed 55 decibels. This has resulted in the loss to the listener of significance in the various levels of the information. For example, in the recording of classical and popular music, the orchestration of the composer is not faithfully reproduced in the systems of the prior art since it often exceeds the dynamic range of the recording and reproducing systems presently available.

This invention increases the dynamic range of a recording and reproducing system by recording the signal representative of the information on the magnetic medium such as a tape with at least two levels of intensity. For example, in one embodiment of the invention the signal is recorded on the magnetic medium in two tracks, one track containing the signal at a level of approximately 20 decibels lower than the other track. Both tracks are then reproduced to provide two output signals both representing the same information but at different recording levels. The output signal representing the higher recorded information is monitored to determine when the information being reproduced at the higher level has exceeded a particular amplitude value on the tape so as to have become saturated and distorted during recording. This particular amplitude value may be arbitrarily chosen so as to represent when the upper limit of the 55-decibel range of the magnetic material has been reached.

The higher level output signal may be monitored during reproduction by using a trigger circuit which is maintained either on or off in accordance with the level of the higher level output signal. For example, when the amplitude of the higher level output signal exceeds the particular value, the trigger circuit may be turned on to produce a control signal. When the higher level output signal falls below the particular value, the trigger circuit is turned off to extinguish the control signal.

The off condition of the trigger circuit represents the operation of the reproducing system in its normal range. The on condition of the trigger circuit occurs during the operation of the reproducing system at a level which represents the saturation of the magnetic medium and resultant distortion in the recorded signal. When the amplitude of the information exceeds the magnetic capabilities of the medium such as the magnetic tape, the signal produced by the trigger circuit controls a variable impedance means to attenuate the higher level output signal and to pass the lower level output signal. Since the lower level output signal represents information recorded on the first track approximately 20 decibels below the information recorded on the second track, a distorted signal contained on the second track is within the normal range in which signals have been recorded on the first track. The controlled use of the two levels of the recorded information, therefore, extends the dynamic range of the reproducing system to approximately 75 decibels. It will be appreciated that the extension of the dynamic range from approximately 55 to 75 decibels is only by way of example and that other extensions of range may also be accomplished by the embodiment described above.

In another embodiment of the invention, the information is recorded on a single track on the medium with the recorded signal representing information having adjacent high and low level portions along the track. For example, the information may be monitored so as to control a trigger circuit to produce a control signal when the information is above a particular value. The particular value represents the amplitude of the information which is the maximum value which may be tolerated before the recording medium suffers appreciable saturation and distortion.

When the particular value of information is reached, the control signal varies an impedance means to attenuate the information 20 decibels below its normal value. When the amplitude of the information returns to the normal recording range, the trigger circuit is turned off and the information is recorded without attenuation. The signal representing the information is recorded at either one of two levels dependent upon the amplitude of the original information. The dynamic range of the recording system is therefore increased by an amount equal to the difference in the two levels at which the information may be recorded along the track on the medium.

During reproduction of the information recorded at the two different levels along the track, it is necessary to know at each instant of time the particular level of recording. A keying signal may be recorded on the medium to indicate the level as the information is being reproduced. For example, the keying signal may consist of an alternating signal having a first amplitude for one level of recording and a second different amplitude for the other level of recording. The keying signal may be recorded concurrently on a separate track adjacent the track of information.

During reproduction, both the signal representing the information and the keying signal are reproduced from the recording medium. The keying signal is then used to vary an impedance means to attenuate only those portions of the signal which represent information recorded at the higher level. The resultant output signal is therefore equalized to represent the original information.

The above described embodiment can be advantageously employed for the recording of multiple track information. For example, a two-channel stereophonic system requires two tracks on the medium to separately record the two channels of the stereophonic information. However, only a single track is necessary for the keying signals associated with each track of information since the keying signals may be distinguished one from the other by the use of different frequencies for each keying signal. The keying signals may be separated during reproduction by the use of filters.

This invention also pertains to methods of increasing the dynamic range of a recording and reproducing system.

Figure 1:
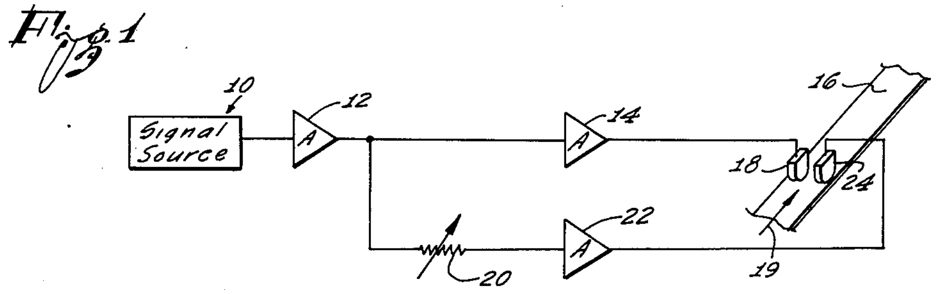
FIGURE 1 is a block diagram of a system for recording the same information at two levels on two tracks on a recording medium.
Figures 2, 3:
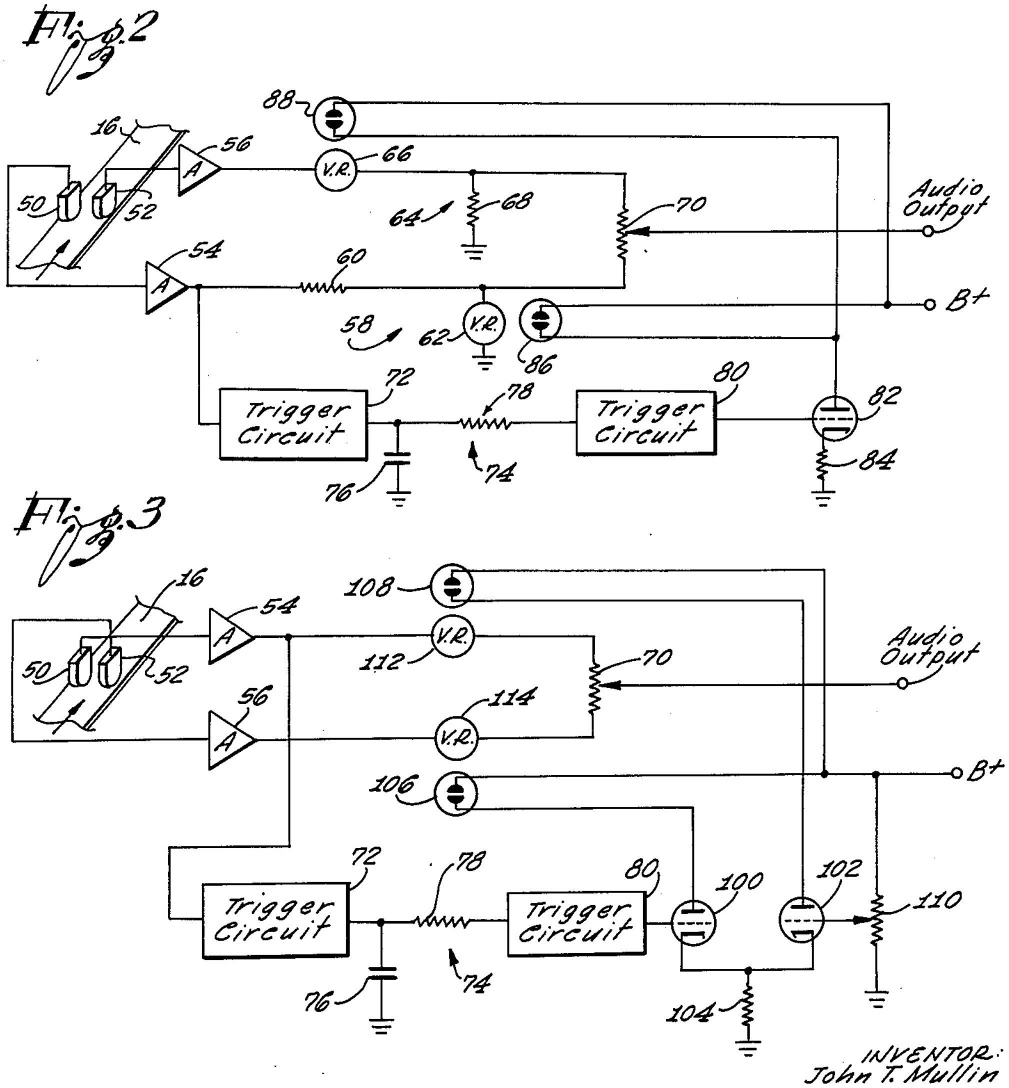
FIGURE 2 is a system shown, partly in block and partly in schematic form, for reproducing information recorded on a recording medium by the system illustrated in FIGURE 1.
FIGURE 3 is an alternative system, shown partly in block and partly in schematic form, for reproducing information recorded on a medium by the system illustrated in FIGURE 1.
Figure 4:
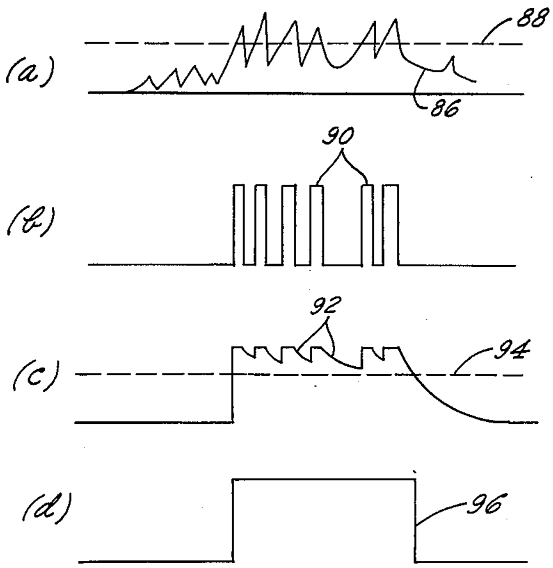
Figure 5:
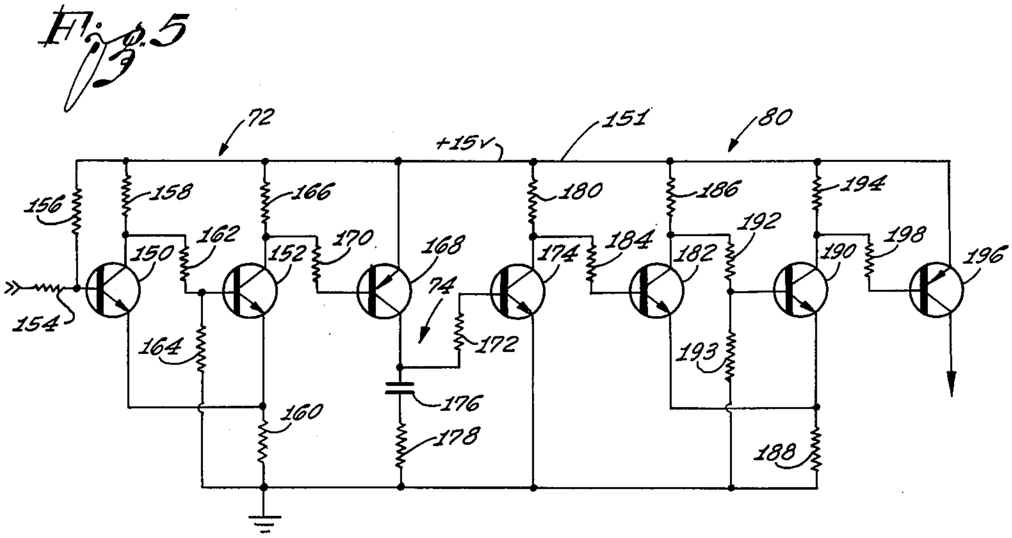
Figure 6:
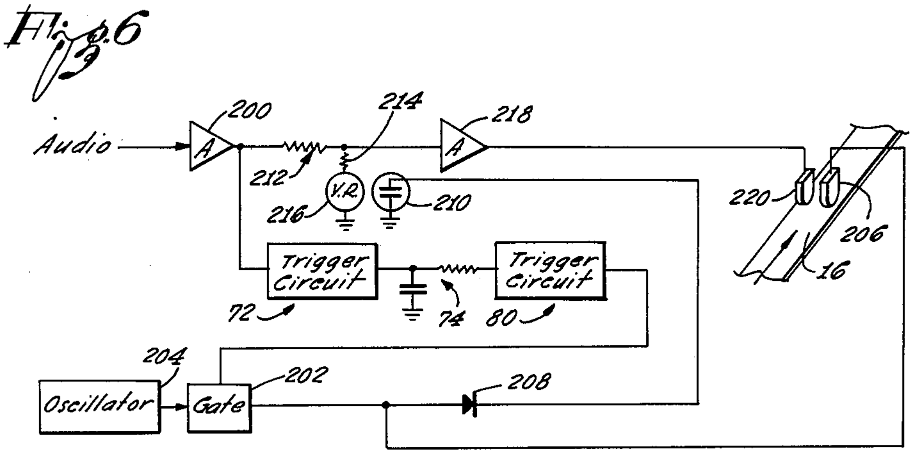
Figure 7:
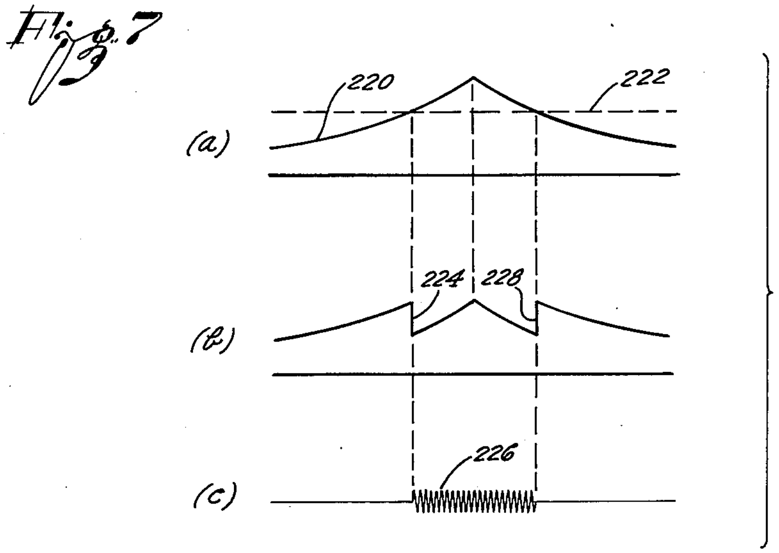
Figure 8:
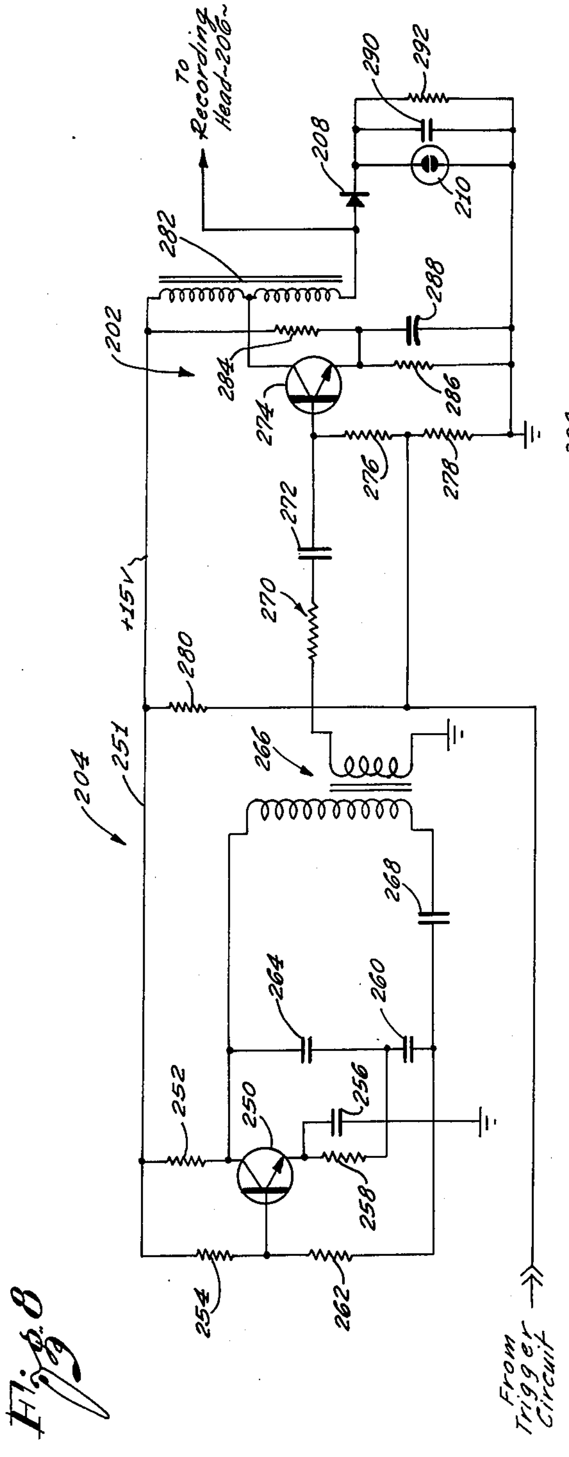
Figure 9:
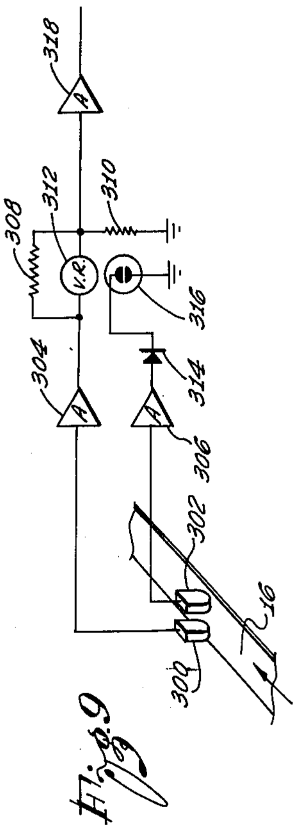

FIGURE 4 provides illustrations of signals used in explaining the operation of the recording and reproducing systems shown in FIGURES 1 through 3;

FIGURE 5 is a detailed diagram of a trigger circuit included in the reproducing systems of FIGURES 2 and 3;

FIGURE 6 is a system, shown partly in block and partly in schematic form, for recording information at two levels on a single track on a recording medium;

FIGURE 7 provides illustrations of signals used in explaining the operation of the recording system of FIGURE 6;

FIGURE 8 is a detailed diagram of circuitry included in the recording system of FIGURE 6; and FIGURE 9 is a system, shown partly in block and partly in schematic form, for reproducing information recorded on a medium by the system illustrated in FIGURE 6.

In FIGURE 1, an information signal is produced by a source 10 such as a microphone which converts audible sound into electrical signals. The information signal is applied to an amplifier 12 to produce an increase in the intensity of the signal. The information signal then passes through a recording amplifier 14 in a first path for recording on a medium, such as a magnetic tape 16, by a recording head 18. The medium 16 is moved relative to the head 18 in a direction indicated by an arrow 19 to produce a first track of information on the medium 16. The recording amplifier 14 is designed to provide the proper biasing of the information signal so as to record the signal on the medium with a minimum of distortion and noise.

The information signal also passes through an adjustable attenuator 20 and a recording amplifier 22 in a second path to be recorded on a second track on the medium 16 by a recording head 24. The attenuator 20 is adjusted to provide a suitable reduction such as a 20 decibel reduction in the level of the signal in the second path as compared with the level in the first path. The recording amplifier 22 and recording head 24 may respectively have substantially identical characteristics to the recording amplifier 14 and recording head 18. In this case, the attenuator 20 provides the only dissimilarity in the two paths, and the amount of attenuation produced by the attenuator 20, therefore, determines the difference in the levels of the information which are recorded on the two tracks on the medium 16.

FIGURE 2 illustrates a first embodiment of a reproducing system used in conjunction with the recording system of FIGURE 1. Two heads 50 and 52 are displaced adjacent to the medium 16 as the medium moves to reproduce the information contained on the two tracks on the medium. The information recorded at the higher level is reproduced by the head 50 and applied to the amplifier 54. The information then passes through an attenuating network 58 composed of a resistor 60 and a variable photosensitive resistor 62. The photosensitive resistor 62 is responsive to light to vary between values of 1000 ohms and 10 megohms.

The information recorded at the lower level is reproduced by the head 52 and is introduced through the amplifier 56 to an attenuating network 64. The network 64 is composed of a variable photosensitive resisor 66 and a resistor 68. The photosensitive variable resistors 62 and 66 have similar characteristics and may be of the type designated as Raysistor and manufactured by the Raytheon Corporation or may be a type 403ASL manufactured by the Clairex Corporation. The resistors 60 and 68 have values intermediate the high and low value of the photosensitive resistors 62 and 66. For example, the resistors 60 and 68 may have a value of 220 kilohms. The output signals from the attenuating networks 58 and 64 are connected to the end terminals of a potentiometer 70. The audio output from the reproducing system is taken from the movable arm of the potentiometer 70.

The information recorded at the higher level is monitored by connecting the output of the amplifier 54 to the input of a first trigger circuit 72. The signal produced by the trigger circuit passes through a long time constant circuit 74 consisting of a capacitor 76 and a resistor 78 and is then applied to a second trigger circuit 80. The output signal from the second trigger circuit 80 is applied to the grid of a vacuum tube 82 to control the operation of the tube.

A resistor 84 is electrically disposed between the cathode of the tube 82 and a reference potential such as ground. The plate of the tube 82 is connected through a light means for producing light of a first and second intensity, such as a pair of neon light sources 86 and 88 in parallel, to a source of power indicated as B+. The neon light sources are therefore controlled to be on or off in accordance with the operation of the tube 82 in a state of conduction or nonconduction.

The trigger circuit 72 is designed to produce an output signal when the input to the trigger circuit 72 is above a particular value. As indicated above, the particular value is chosen to be in accordance with a maximum signal which may be recorded on the medium 16 before the recorded signal has an appreciable distortion. The operation of the trigger circuit 72 can be seen with reference to FIGURES 4(*a*) and 4(*b*). FIGURE 4(*a*) illustrates a signal 86 which is representative of the information recorded at a higher level as it is reproduced from the tape 16. The information recorded at a lower level has identical characteristics to those shown in FIGURE 4(*a*) except for a decrease in the intensity of the signal. It will be seen from FIGURE 4(*a*) that the amplitude of the information fluctuates rapidly but there are areas in which the amplitude of the information is generally high and there are areas where the level is generally low.

When the information exceeds a particular value, which is illustrated by a dotted line 88 in FIGURE 4(*a*), the trigger circuit 72 is designed to produce an output signal for a period corresponding to the length of time that the information is above the particular value. The output from the trigger circuit 72 is illustrated in FIGURE 4(*b*) as a series of pulses 90. The pulses are applied to the long time constant circuit 74 to allow the pulses produced by the trigger circuit 72 to decay at a relatively slow rate. The decayed signals produced by the long time constant circuit 74 are illustrated at 92 in FIGURE 4(*c*).

The output from the long time constant circuit 74 is applied to the second trigger circuit 80. The triggering level of the second trigger circuit 80 is illustrated by a dotted line 94 in FIGURE 4(*c*). It can be seen that the long time constant circuit 74 maintains the signal applied to the second trigger circuit 80 above the triggering level for a considerable period of time. The output from the second trigger circuit 80 is illustrated at 96 in FIGURE 4(*d*). It will be seen that the second trigger circuit 80 produces a constant level control signal which has a considerably greater duration than the output from the first trigger circuit 72. The control signal produced by the monitoring system is therefore on for the entire length of time at which the information generally has a high amplitude, and not just for the short periods of time that only portions of the information are above the particular value.

The control signal 96 from the trigger circuit 80 is applied to the grid of the tube 82 to control the operation of the tube. When the control signal 96 is being produced, the tube 82 is biased to conduction to obtain a flow of current through the neon glow tubes 86 and 88. The light produced by the tubes 86 and 88 maintains the resistance of the photosensitive variable resistors 62 and 66 at a relatively low value. When the control signal 96 is not being produced, the tube 82 is biased nonconductive so that no current flows through the neon tubes 86 and 88. The tubes 86 and 88 therefore produce no light and the resistors 62 and 66 are maintained at a high value of impedance.

As indicated above, the photosensitive resistor 66 has a value of approximately 10 megohms if not subjected to light and the resistor 68 has a value of approximately 220 kilohms. Since the resistor 66 has a substantially larger value than the resistor 68 when the control signal 96 is not being produced by the trigger circuit 80, a negligible portion of the information signal applied to the attenuating network 64 appears across the resistor 68. Consequently, the information reproduced by the head 52 is substantially attenuated and does not appear across the potentiometer 70 as an audio output. At the same time, the information reproduced by the head 50 appears substantially across the resistor 62 so as to be applied as an audio output through the potentiometer 70. This results from the fact that the photosensitive resistor 62 has an impedance which is considerably higher than the resistance value of the resistor 60.

When the control signal 96 is being produced by the trigged circuit 80, the neon tubes 86 and 88 emit light. This light causes the values of the photosensitive resistors 62 and 66 to become reduced to the low impedance value of approximately 1000 ohms. The operation of the attenuating networks 58 and 64 is accordingly reversed. For example, since the photosensitive resistor 66 now has a low value compared to the resistor 68, substantially all the information appears across the resistor 68. However, in the attenuating network 58 the resistor 60 is much greater in value than the photosensitive resistor 62 so that a negligible portion of the information appears across the resistor 62. The audio output from the potentiometer 70 is therefore composed substantially of the signal reproduced by the head 52. The amplifiers 54 and 56 in combination with the setting of the movable arm of the potentiometer 70 are initially adjusted so as to equalize the audio output at the same level whether the head 50 or the head 52 is coupled through the attenuating networks as the audio output.

FIGURE 3 is a second embodiment of a system for reproducing the information recorded on the magnetic tape 16 by the system shown in FIGURE 1. Elements having similar functions are given the same reference character as in FIGURE 2. The information on the two tracks on the tape 16 is reproduced by the heads 50 and 52 and applied to the amplifiers 54 and 56. The high level track of information is monitored by the trigger circuit 72. The output from the trigger circuit 72 is coupled through the time constant circuit 74 consisting of the elements 76 and 78 as in FIGURE 2. The output from the time constant circuit is applied to the trigger circuit 80 which produces a signal to control the operation of vacuum tubes 100 and 102 connected in a differential arrangement.

The monitoring circuit operates in the same manner as described above for the circuit shown in FIGURE 2 and as illustrated in FIGURE 4. When the amplitude of the information reproduced from the information recorded at the high level is below the particular value, the output from the trigger circuit 80 is zero. When the amplitude of the information recorded at the high level is above the particular value, the trigger circuit 80 produces a control signal as illustrated at 96 in FIGURE 4(*d*).

The vacuum tubes 100 and 102 have a common cathode connection and a resistor 104 extends from this connection to a reference potential such as ground. A neon tube 106 is electrically disposed between the plate of the tube 100 and a source of voltage indicated as B+. The plate of the tube 102 is connected through a neon tube 108 to the source of power indicated as B+. A potentiometer 110 is disposed between the source of power such as B+ and the reference potential such as ground and has its movable arm connected to bias the grid of the tube 102. The operation of the neon tubes 106 and 108 controls the production of high or low impedances in the photosensitive resistors 112 and 114 in the same manner as in FIGURE 2. The resistors 112 and 114 in combination with the potentiometer 170 are connected in a series path with the outputs from the amplifiers 54 and 56.

When the control signal produced by the trigger circuit 80 is zero, the tube 100 is biased to be non-conductive so that no current flows through the neon tube 106. The resistance of the photosensitive resistor 114 is therefore very high and the signal from the amplifier 56 is substantially attenuated and does not appear across the potentiometer 70. When the tube 100 is nonconducting, the potential on the cathode of the tube 102 is almost at ground. Since the grid of the tube 102 is biased to a positive value by the voltage applied from the movable arm of potentiometer 110, the ground potential on the cathode of the tube causes the tube to become conductive. The neon tube 108 is therefore illuminated and the impedance of the photosensitive resistor 112 becomes low. The output from the amplifier 54 therefore passes through the variable resistor 112 substantially unattenuated and appears across the potentiometer 70 as an audio output.

When the amplitude of the information recorded at the high level is above the particular value, the trigger circuit 80 produces the control signal 96 for introduction to the grid of the tube 100. The control signal 96 is sufficiently positive to cause the tube 100 to become conductive. The neon tube 106 now becomes illuminated so that variable resistor 114 receives a low value of impedance. The output signal from the amplifier 56 passes through the resistor 114 substantially unattenuated and appears across the potentiometer 70 as an audio output.

Since the voltage on the cathode of the tube 102 is now relatively positive compared to the potential on the grid of the tube, the tube becomes cut off. The neon tube 108 is therefore extinguished and the photosensitive resistor 112 is varied to a high impedance value. The output from the amplifier 54 is substantially attenuated by the variable resistor 112 and does not appear across the potentiometer 70 as an audio output. As in FIGURE 2, the amplification factors of the amplifiers 54 and 56 and the position of the movable arm of the potentiometer 70 are initially adjusted to provide an equalized output no matter which track of information is present as the audio output.

FIGURE 5 is a detailed diagram of a circuit which may be used for the trigger circuits 72 and 80 and the time constant circuit 74 shown in FIGURES 2 and 3. The trigger circuit 72 may be composed of transistors 150 and 152 connected together to form a Schmidt trigger. The transistor may both be a NPN type 2N1974.

The input to the Schmidt trigger is through a resistor 154 which may have a value of 100 kilohms. The resistor 154 is connected to the base of the transistor 150. A bias resistor 156 which may have a value in the order of 68 kilohms is electrically disposed between the base of the transistor 150 and a positive source 151 of voltage, such as +15 volts. A resistor 158 which may have a value in the order of 3.3 kilohms has one terminal connected to the positive source 151 of voltage and the other terminal connected to the collector of the transistor 150. A resistor 160 having a value of approximately 5.6 kilohms is disposed between the common juncture of the emitters of the transistors 150 and 152 and the reference potential such as ground.

A resistor 162 which preferably has a value in the order of 1.8 kilohms is connected between the collector of the transistor 150 and the base of the transistor 152. One terminal of a resistor 164 has a common connection with the base of the transistor 152, and the other terminal is disposed electrically at the reference potential such as ground. The resistor 164 may have a value in the order of 6.8 kilohms. A collector supply resistor 166 preferably having a value of 2.2 kilohms is electrically disposed between the collector of the transistor 152 and the source 151 of positive voltage.

When there is no signal present on the base of transistor 150, the transistor is biased nonconductive. However, at the same time, a high positive signal is impressed on the base of the transistor 152 through the resistor 162. The transistor 152 is therefore conductive when the transistor 150 is nonconductive. The situation is reversed, however, when a sufficient voltage is applied to the base of transistor 150 to bias this transistor conductive. Upon the occurrence of a state of conductivity in the transistor 150, the voltage on the collector of the transistor 150 and voltage on the base of transistor 152 becomes reduced to drive the transistor 152 to cutoff. The common emitter resistor 160 acts as a feedback element to speed this switching from one state to another in the transistors 150 and 152. This particular type of trigger circuit is chosen since it has an extremely fast switching time. The speed of switching is desirable in the present invention since the switching from one level of information to the other should be as rapid as possible so as to retain the transient present in the information.

The output from the transistor 152 is applied through a resistor 170 to a phase inverter including a transistor 168. The resistor 170 preferably has a value of 1.8 kilohms. The transistor may be a PNP type 2N597. The output from the phase inverter is taken from the collector of the transistor 168 and applied to one terminal of a resistor 172. The resistor 172 which may have a value in the order of 100 kilohms has its other terminal connected to the base of a transistor 174. A capacitor 176 which may have a value in the order of 1.0 microfarad has a common juncture with the resistor 172 and the collector of the transistor 168. A resistor 178 is electrically disposed between the capacitor 176 and a reference potential such as ground. This resistor may have a value in the order of 47 ohms.

The resistor 172 and the capacitor 176 serve as the time constant circuit 74 shown in FIGURES 2 and 3. The operation of the time constant circuit has been explained with reference to FIGURE 4(*c*). It is also noted that the time constant circuit 74 produces a delayed switching in trigger circuit 80 after the input to the time constant circuit has remained at zero for a particular period of time dependent upon the time constant of the circuit. An appreciable length of time must occur before the time constant circuit allows the input to the trigger circuit 80 to decay to the point where the trigger circuit 80 is cut off. Although, as indicated before, it is desirable to have rapid switching, this is only important as the information goes from a low to a high level. The delayed operation in the operation of the circuit 74 is not harmful when the information is falling from a high level to a low level since at this time the transient content of the audio information is not significant.

The output from the time constant circuit 74 is applied to the base of a transistor 174 which may be a NPN type 2N1974. A resistor 180 having a value in the order of 4.7 kilohms is disposed between the collector of the transistor 174 and the source 151 of positive voltage. The emitter of the transistor 174 is connected to the reference potential such as ground. The transistor 174 operates to isolate the trigger circuit 72 from the trigger circuit 80.

The output from the isolating circuit including the transistor 174 is applied to the base of a transistor 182 through a resistor 184. The resistor 184 may have a value in the order of 100 kilohms and the transistor 182 may be a NPN type 2N335. A resistor 186 is electrically disposed between the collector of the transistor 182 and the source 151 of positive voltage. The resistor 186 may have a value in the order of 3.3 kilohms and is included to provide a collector bias for the transistor 182.

The emitter of the transistor 182 is connected to one side of a resistor 188 which may have a value in the order of 5.6 kilohms. The other side of the resistor 188 is disposed to the reference potential such as ground. The output from the transistor 182 is applied to the base of a second transistor 190 through a resistor 192 which may have a value in the order of 1.8 kilohms. The transistor 190 may be an NPN type 2N335. A resistor 193 which may have a value in the order of 6.8 kilohms is electrically disposed between the base of the transistor 190 and the reference potential such as ground. The resistor 188 is included as a common emitter resistor for both transistors 182 and 190. A resistor 194 is connected between the collector of the transistor 190 and the source 151 of voltage and may have a value in the order of 2.2 kilohms.

The transistors 182 and 190 operate as a Schmidt trigger circuit in a similar manner to the transistors 150 and 152 such that the transistor 190 is non-conducting when the transistor 182 is conducting and vice versa. As indicated previously, the common emitter resistor 188 provides a feedback to have the switching circuit operate at a very rapid rate. The output from the second trigger stage is coupled through a resistor 198 to an amplifier including a transistor 196. The transistor 196 may be a PNP type 2N597 and the resistor 198 may have a value in the order of 1.8 kilohms. The emitter of the transistor 196 is directly connected to the source 151 of voltage. The output from the transistor 196 is taken from the collector of this transistor and may be applied to either the grid of the tube 82 shown in FIGURE 2 or to the grid of the tube 100 shown in FIGURE 3.

When there is a zero input signal to the transistor 150, the transistor 150 is nonconducting and the transistor 152 is conducting. The output from the transistor 150 is coupled through the phase inverter including the transistor 168 and through the isolating circuit including the transistor 174 to cause the transistor 182 to be conducting and the transistor 190 to be nonconducting. The final output from the transistor 196 is at a zero level. When an input signal is applied to the transistor 150 with a sufficiently positive amplitude to drive the transistor into conduction, the entire operation of the transistors 182 and 190 is reversed and a control signal is produced at the output of the transistor 196.

FIGURE 6 illustrates a recording system used in a second embodiment of the invention. In FIGURE 6 the information is recorded on a single track on the tape 16. An information signal such as an audio signal is applied to an amplifier 200. The output from the amplifier is monitored by a trigger circuit 72, a time constant circuit 74, and a trigger circuit 80. These circuits are similar to those shown in FIGURES 2 and 3. The audio signal, therefore, controls the operation of the output of the trigger circuit 80 in accordance with the amplitude of the audio signal. If the amplitude is above a particular level which would cause distortion in the recording of the information on the tape 16, the trigger 80 produces a control signal. When the information is within the range that can be recorded on the tape 16 without distortion, the trigger circuit 80 produces either a zero signal or a control signal of relatively low level.

The control signal from the trigger circuit 80 controls the operation of a gate 202. Also applied to the gate 202 is the output from an oscillator 204. The oscillator may, for example, produce a 12-kilocycle signal for use as a keying signal. Upon the appearance of the control signal from the circuit 80, the gate opens and the 12-kilocycle signal passes through the gate to be recorded on the medium 16 by a recording head 206. At the same time, the 12-kilocycle signal is rectified by a diode 208 and applied across a neon light 210. The neon light is, therefore, illuminated at the same time that the keying signal is recorded on the medium 16.

The audio signal is also applied to an attenuating circuit composed of resistors 212 and 214 and a variable photosenstive resistor 216. The information is modified by the attenuating circuit and passes through an amplifier 218 to be recorded on the medium 16 by a recording head 220. When the information to be recorded on the medium 16 is within the range which can be recorded without distortion, the neon light 210 is off and the variable resistor 216 has a very high impedance compared to the impedance of the resistor 212. Most of the signal, therefore, appears across the combination of the resistors 214 and 216 and is recorded on the medium 16.

When the information is above the particular amplitude level which can be recorded without distortion, the neon light is turned on by the operation of the trigger circuits to lower the impedance of the photosensitive resistor 216. The values of the resistances 212, 214 and 216 are designed so that when the resistance 216 is at its low impedance value, a 20-decibel decrease is obtained in the audio signal.

Information is, therefore, recorded on the signal track on the tape 16 with adjacent portions having either one of two recording levels dependent upon the amplitude of the original audio information. At the same time that the information is recorded by the head 220, the head 206 records a keying signal adjacent the track of information to indicate at which level the information has been recorded at successive positions on the track on the medium 16. This can be seen with reference to FIGURE 7. FIGURE 7(*a*) shows an audio signal 220 as it is increasing to a particular amplitude level, which is shown by a dotted line 222 in FIGURE 7(*a*). When the audio signal 220 reaches the level 222, it becomes modified by the attenuating circuit including the resistors 212 and 214 and the photosensitive resistor 216 so as to produce a reduction in the amplitude of the signal as indicated at 224 in FIGURE 7(*b*). FIGURE 7(*c*) illustrates the recording of a keying signal 226 during the same period of time that the information signal is being attenuated. When the information signal returns to a normal amplitude level, no keying signal is recorded by the recording head 206 on the tape 16 and the attenuation of the audio signal is eliminated as indicated at 228 in FIGURE 7(*b*).

FIGURE 8 is a detailed diagram of circuitry used in the system of FIGURE 6. The oscillator generally indicated at 204 includes a transistor 250 which may be a NPN type 2N1974. A resistor 252 is connected between the collector of the transistor 250 and a source 251 of positive voltage. A resistor 254 is electrically disposed between the base of the transistor 250 and the source of voltage. The resistors 252 and 254 may have values in the order of 3.3 kilohms and 180 kilohms, respectively, and the source 251 of voltage may provide a potential of approximately +15 volts. The emitter of the transistor 250 is coupled to a reference potential such as ground through a capacitance 256 which may have a value in the order of 10 micromicrofarads.

A resistor 258 having a value in the order of 100 ohms has one terminal connected to the emitter of the transistor 250. The other terminal of the resistor 258 has a common junction with a capacitor 260 and a capacitor 264, each of which may have a value of .05 microfarad. A resistance 262 having a value in the order of 10 kilohms is electrically disposed between the base of the transistor 250 and the capacitor 260. The capacitance 264 has its other terminal connected to the collector of the transistor 250. The primary winding of a transformer 266 has one terminal directly connected to the collector of the transistor 250 and has the other terminal connected to the junction of the capacitor 260 and the resistor 262 through capacitor 268. The capacitor 268 may have a value in the order of 0.75 microfarad.

The secondary winding of the transformer 266 is coupled to a series circuit consisting of a resistor 270 and a capacitance 272 which may have values in the order of 5 kilohms and .01 microfarad, respectively. The series circuit couples the output from the oscillator 204 to the base of a transistor 274 to operate as the gate 202. The transistor may be a NPN type 2N1974. The base bias for the transistor is supplied through a voltage dividing network consisting of resistors 276, 278 and 280. The resistors may have values in the order of 10 kilohms, 10 kilohms and 180 kilohms, respectively.

The control signal to the gate from the second trigger circuit 80 shown in FIGURE 6 is to the juncture of resistors 276, 278 and 280. The collector of the transistor 274 is connected through one-half of a step-up transformer 282 to the source of voltage. A resistance 284 is disposed between the emitter of the transistor 274 and the source of voltage. Resistance 286 and capacitance 288 are connected in parallel between the emitter of the transistor 274 and the reference potential such as ground. The resistance 284 may have a value in the order of 300 ohms and the resistance and capacitance 286 and 288 may respectively have values of 300 ohms and 25 micromicrofarads, respectively.

The output from the gate circuit generally designated as 202 is taken from the second half of th step-up transformer 282. This output is split into two paths, one of which is applied to the recording head 206 and the other of which is applied to the rectifier 208. The output from the rectifier controls the operation of the neon tube 210. A capacitor 290 and resistor 292 connected in parallel across the neon tube 210 are provided to adjust the time constant of the neon tube, if this should be desired. A separate output is taken before the rectifier 208 and is applied to the recording head 206.

The oscillator 204 produces a 12-kilocycle signal which is coupled to the gate 202. The input to the gate 202 from the trigger circuit 80 controls the operation of the transistor 274 such that the 12-kilocycle signal does not pass through the transistor 274 when no control signal is applied. When a control signal is applied, the transistor 274 becomes conductive and an output signal of 12 kilocycles appears at the center tap of the transformer 282. The amplitude of the 12-kilocycle signal is increased by the transformer 282 and is recorded on the medium 16 by the recording head 206. The 12-kilocycle signal is also rectified by the diode 208 to control the operation of the neon tube 210.

FIGURE 9 illustrates a system for reproducing the information recorded on the medium 16 by the recording system of FIGURE 6. The recording heads 300 and 302 reproduce the information contained on the two tracks on the medium 16. The audio information reproduced by the head 300 is applied to an amplifier 304. The keying signal reproduced by the head 302 is applied to an amplifier 306. The audio signal is illustrated in FIGURE 7(*b*) and the keying signal is illustrated in FIGURE 7(*c*). The audio signal passes through an attenuating network comprising a resistance 308, a resistance 310 and a photosensitive resistor 312. When a keying signal appears it is rectified by a diode 314 and applied across a neon tube 316 to control the impedance of the resistor 312. The output from the attenuating network is coupled through an amplifier 318 as an audio output.

When the audio information is within the normal recording range, no keying signal is present on the medium 16. The neon light 316 is out and the photosensitive resistor 312 has a very high impedance compared with the resistor 308. Most of the audio information is, therefore, shunted around the resistor 312 by the resistor 308. The resistors 308 and 310 are designed to produce a 20-decible attenuation of the signal. When the audio information has an amplitude which would be distorted by the recording medium, the recording system of FIGURE 6 attenuates the signal 20 decibels. This 20-decibel reduction in audio signal is detected by the appearance of the keying signal on the medium 16. The keying signal controls the operation of the neon tube 316 to vary the impedance of the resistor 312 from a high value to a very low value as compared with the impedance of the resistor 308. Now most of the audio signal is shunted through the resistor 312 with substantially no attenuation. The output signal from the reproducing system is, therefore, equalized for all levels of information which appear on the information track on the recording medium 16.

It will be appreciated that although the recording and reproducing system of FIGURES 6 through 9 have been shown with reference to a single track of information on the recording medium 16, the system may also record and reproduce stereophonic information. For example, two tracks of information may be recorded on the medium 16 using two systems as shown in FIGURE 6. However, it is not necessary to have a separate track for each keying signal. It is sufficient that a single keying track may contain various oscillating signals differentiating one from the other to indicate which track of information the keying signals represent. For example, one keying signal may have a frequency of 12 kilocycles and the other may have a value of 15 kilocycles. It is then necessary to provide filter networks at the output of the reproducing head to pass the appropriate keying signals to the appropriate neon lights.

Although this application has been illustrated with reference to particular embodiments, it will be appreciated that other modifications and adaptions may be made and this invention is, therefore, only to be limited by the appended claims.

What is claimed is:

1. In combination in a recording and reproducing system, the recording medium of which has a maximum dynamic range, said system including means for recording and reproducing without distortion an information signal of a dynamic range greater than the maximum range of said recording medium, said recording means being disposed relative to the recording medium and responsive to the information signal for recording the information signal at a first and second level, said first level being at a predetermined lower level than said second level such that components of the information signal will not exceed the upper limit of the dynamic range of the recording medium, and said second level being at a higher level than said first level such that high level components of the information signal exceed the upper limit of the dynamic range of said recording medium, said reproducing means being disposed relative to the recording medium for reproducing the information signal recorded by the recording means over the dynamic range of the information signal and for applying to an output terminal a signal based upon said information signal, and means operatively connected to said reproducing means for monitoring components of the information signal recorded at said second level which exceed a predetermined amplitude, said predetermined amplitude being selected so as to approximately represent when the upper limit of the dynamic range of the recording medium has been reached, said monitoring means including circuit means for normally causing the signal supplied by said reproducing means to the output terminal to be based upon the information signal recorded at said second level, and said monitoring means also including means for producing a control signal when components of the information signal recorded at said second level exceed said predetermined amplitude and switching means responsive to said control signal to abruptly affect the operation of said circuit means in such a manner as to cause the signal supplied by said reproducing means to the output terminal to be based upon the information signal recorded at said first level when the information signal recorded at said second level would exceed said predetermined amplitude.

2. The system of claim 1 in which the recording means includes first and second recording devices disposed relative to the recording medium and responsive to the information signal, said first device recording the information on the recording medium at a first level and the second recording device recording the information on the recording medium at a second higher level.

3. The system of claim 1 in which the recording medium is a magnetic tape and in which the recording means and reproducing means includes at least one magnetic head in contact with said tape.

4. The system of claim 1 wherein said recording means includes a first recording means for normally recording the information signal on the recording medium at one level such that high level components of the information signal would exceed the upper limit of the dynamic range of the recording medium, switching means, operatively connected to said recording means, actuated when the amplitude of the information signal exceeds a predetermined amplitude, said predetermined amplitude being selected so as to approximately represent when the upper limit of the dynamic range of the recording medium has been reached, control means operatively connected to said switching means and effective in response to said switching means being actuated whenever the amplitude of the information signal being recorded at said one level exceeds said predetermined amplitude, said control means causing said recording means to record the signal said recording medium at a predetermined lower level such that components of the information signal will not exceed the upper limits of the dynamic range of the recording medium, second recording means, and gating means operatively connected to and controlled by said control means and said switching means to cause said second recording means to record when said information signal level is recorded by said first recording means at said one level and when it is recorded at said predetermined lower level.

5. The system of claim 1 in which said recording means normally records the information signal on the recording medium at one level such that high level components of the information signal would exceed the upper limit of the dynamic range of the recording medium, switching means, operatively connected to said recording means, actuated when the amplitude of the information signal exceeds a predetermined amplitude, said predetermined amplitude being selected so as to approximately represent when the upper limit of the dynamic range of the recording medium has been reached, and control means operatively connected to said switching means and effective in response to said switching means being actuated whenever the amplitude of the information signal being recorded at said one level exceeds said predetermined amplitude, said control means causing said recording means to record the signal on said recording medium at a predetermined lower level such that components of the information signal will not exceed the upper imits of the dynamic range of the recording medium.

6. The recording system of claim 5 in which the recording medium is a magnetic tape and in which the recording means includes a magnetic recording head.

7. In combination in a recording and reproducing system, the recording medium of which has a maximum dynamic range, said system including means for recording and reproducing without distortion an information signal of a dynamic range greater than the maximum range of said recording medium, said recording means being disposed relative to the recording medium and responsive to the information signal for recording the information signal on the recording medium, said recording means recording the information signal at a first level and second level, said first level being at a predetermined lower level than said second level such that components of the information signal will not exceed the upper limit of the dynamic range of the recording medium, and said second level being at a higher level than said first level such that high level components of the information signal exceed the upper limit of the dynamic range of said recording medium;

said reproducing means being disposed relative to the recording medium for reproducing the information signal recorded by the recording means over the dynamic range of the information signal and for applying to an output terminal a signal based upon said information signal, means operatively connected to said reproducing means for monitoring components of the information signal recorded at said second level which exceed a predetermined amplitude, said predetermined amplitude being selected so as to approximately represent when the upper limit of the dynamic range of the recording medium has been reached, said monitoring means including at least one photosensitive resistor variable in resistance between a first value and a second relatively higher value operatively coupled to said reproducing means, and light means operatively coupled to said monitoring means and to said photosensitive resistor for producing light of a first and second intensity for varying the resistance of the photosensitive resistor between said first and second values, and said light means being responsive to said monitoring means for producing light at one intensity to maintain the resistance of the photosensitive resistor at one value to cause the signal supplied to said output terminal by said reproducing means to be based substantially on the information signal recorded at said second level and for producing light at the other intensity to vary the resistance of the photosensitive resistor to its other value when components of the information signal recorded at said second level exceed said predetermined amplitude to cause the signal supplied by said reproducing means to said output terminal to be based substantially upon the information signal recorded at said first level.

8. In combination in a recording and reproducing system, the recording medium of which has a maximum dynamic range, said system including means for recording and reproducing without distortion an information signal of a dynamic range greater than the maximum range of said recording medium, said recording means being disposed relative to the recording medium and responsive to the information signal for recording the information signal on the recording medium, said recording means recording the information signal at a first level and second level, said first level being at a predetermined lower level than said second level such that components of the information signal will not exceed the upper limit of the dynamic range of the recording medium, and said second level being at a higher level than said first level such that high level components of the information signal exceed the upper limit of the dynamic range of said recording medium, said reproducing means being disposed relative to the recording medium for reproducing the information signal recorded by the recording means over the dynamic range of the information signal and for applying to an output terminal a signal based upon said information signal, means operatively connected to said reproducing means for monitoring components of the information signal recorded at said second level which exceed a predetermined amplitude, said predetermined amplitude being selected so as to approximately represent when the upper limit of the dynamic range of the recording medium has been reached, said monitoring means including an impedance means variable between a first value and a second relatively higher value operatively coupled to said reproducing means, electronic means operatively coupled to said monitoring means and to said impedance means for varying the resistance of said impedance means between said first and second value, said electronic means being responsive to said monitoring means to maintain the impedance of the impedance means at one value to cause the signal supplied to said output terminal by said reproducing means to be based substantially upon the information signal recorded at said second level and for varying the impedance of the impedance means to its other value when components of the information signal recorded at said second level exceed said predetermined amplitude to cause the signal supplied by said reproducing means to said output terminal to be based substantially on the information signal recorded at said first level, and means operatively coupled to said reproducing means for supplying to the output terminal the amplified output of said reproducing means at a constant level regardless of whether the signal supplied to said output terminal is based upon that recorded at the first or the second level.

9. The system of claim 8 in which the recording means continuously records the information signal at both the first and second levels and in which the impedance means is effective to select whether the output supplied to the output terminal is based upon that recorded at the first level or upon that recorded at the second level.

10. The system of claim 8 in which the recording means selectively records the information signal at either the first or the second level depending upon the amplitude of the signal and in which the monitoring means is effective to change the amount of amplification depending upon whether the output supplied to the output circuit is based upon that recorded at the first level or upon that recorded at the second level.

11. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, said fourth means including attenuating means operatively coupled to said amplifying portion of said fourth means such that the resultant amplification of said fourth means is sufficiently less than that produced by said third means and the resultant signal of said fourth means is equal in magnitude to that produced by said third means, an output circuit, and fifth means for normally connecting the output of said fourth means to said output circuit but effective only for amplitude values of the information signal above a particular value of that of said fourth means to said output circuit.

12. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operatively connected to the amplifying sections of said third and fourth means, for equalizing the amplified outputs of said amplifying sections, and sixth means operatively connected between said third and fifth and said fourth and fifth means for supplying to an output circuit the output of said fourth means when the amplitude values of the information signal are below a particular value and for supplying to the output circuit the equalized output of said third means when the values of the information signal are above a particular value at which distortion might occur.

13. In combination in a recording and reproducing system, the recording medium of which has a maximum dynamic range, said system recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operatively connected to said amplifying sections of said third and fourth means for equalizing the amplified outputs of said amplifying sections, and sixth means operatively connected between said third and fifth and said fourth and fifth means for supplying to an output circuit the output of said fourth means when the amplitude values of the information signal are below a particular value, said sixth means including a resistor for controlling whether the output circuit is supplied with the output of said third or said fourth means and in which electronic means responsive to the amplitude of the output of the fourth means is effective to change abruptly and very materially the resistance of said resistor for supplying to the output circuit the equalized output of said third means whenever the amplitude of the output of the fourth means exceeds a value at which distortion might occur.

14. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operatively connected to the amplifying sections of said third and fourth means for equalizing the amplified outputs of said amplifying sections, and sixth means operatively connected between said third and fifth and said fourth and fifth means for supplying to an output circuit the output of said fourth means when the amplitude values of the information signal are below a particular value, said sixth means including a photosensitive resistor for controlling whether the output circuit is supplied with the output of said third or said fourth means and in which electronic means responsive to the amplitude of the output of the fourth means is effective to change abruptly and very materially the resistance of said photosensitive resistor for supplying to the output circuit the equalized output of said third means whenever the amplitude of the output of the fourth means exceeds a value at which distortion might occur.

15. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operatively connected to the amplifying sections of said third and fourth means, for equalizing the amplified outputs of said amplifying sections, and sixth means operatively connected between said third and fifth and said fourth and fifth means for supplying to an output circuit the output of said fourth means when the amplitude values of the information signal are below a particular value, said sixth means including two resistors for controlling whether the output circuit is supplied with the output of said third or said fourth means and in which electronic means responsive to the amplitude of the output of the fourth means is effective to change abruptly and very materially the resistance of said resistors for supplying to the output the equalized output of said third means whenever the amplitude of the output of the fourth means exceeds a value at which distortion might occur.

16. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operatively connected to the amplifying section of said third and fourth means, for equalizing the amplified outputs of said amplifying sections, and sixth means operatively connected between said third and fifth and said fourth and fifth means for supplying to an output circuit the output of said fourth means when the amplitude values of the information signal are below a particular value, said sixth means including two resistors, one resistor connected with said third means and the other resistor connected with said fourth means, said resistors being so connected that when the resistance of said resistor decreases, the output of the fourth means decreases, said resistors controlling whether the output circuit is supplied with the output of said third or said fourth means and in which electronic means responsive to the amplitude of the output of the fourth means is effective to change abruptly and very materially the resistance of said resistors for supplying to the output circuit the equalized output of said third means whenever the amplitude of the output of the fourth means exceeds a value at which distortion might occur.

17. In combination in a recording and reproducing system, the recording medium of which has a maximum dynamic range, said system including means for recording and reproducing without distortion an information signal of a dynamic range greater than the maximum range of said recording medium, first means disposed relative to the recording medium and responsive to the information signal for recording the information signal on the recording medium at a first level, second means disposed relative to the recording medium and responsive to the information signal for recording the information signal on the recording medium at a second higher level, third means disposed relative to the recording medium for reproducing the signal recorded by the first means and for amplifying the same, fourth means disposed relative to the recording medium for reproducing the signal recorded by the second means and for amplifying the same, fifth means operativley connected to the amplifying sections of said third and fourth means for equalizing the amplified outputs of said amplifying sections, and sixth means operatively connected between said third and fifth and said fourth and fifth means for supplying to an output circuit the output of said fourth means when the amplitude values of the information signal are below a particular value, said sixth means including two resistors, one resistor connected with said third means and the other resistor connected with said fourth means, said resistors being so connected that when the resistance of the resistor associated with said third means decreases, the output of said third means increases and the other resistor being so connected with said fourth means that when its resistance increases, the output of said fourth means decreases, and in which electronic means responsive to the amplitude of the output of the fourth means is effective whenever the amplitude of the output of the fourth means exceeds the value at which distortion might occur to abruptly and very materially decrease the resistance of the resistor associated with said third means and increase the resistance of the resistor associated with said fourth means.

References Cited by the Examiner

UNITED STATES PATENTS

| | | | |
|---|---|---|---|
| 1,925,608 | 9/1933 | Round. | |
| 2,628,346 | 2/1953 | Burkhart | 179—100.2 |
| 3,099,708 | 7/1963 | Smith | 178—6.6 |
| 3,152,223 | 10/1964 | Wessels | 179—100.2 |

IRVING L. SRAGOW, *Primary Examiner.*

BERNARD KONICK, *Examiner.*

McGITTES, *Assistant Examiner.*